S. L. ALLEN.

Planting Machine.

No. 4,092. Reissued Aug. 9, 1870.

WITNESSES { Wm. A. Steel.
Jno. B. Harding.

Samuel L. Allen
by his Attys.
Howson and Sons.

N. PETERS, Photo-Lithographer, Washington, D.C.

UNITED STATES PATENT OFFICE.

SAMUEL LEEDS ALLEN, OF CINNAMINSON, NEW JERSEY.

IMPROVEMENT IN PLANTING-MACHINES.

Specification forming part of Letters Patent No. 84,247, dated November 24, 1868; Reissue No. 4,092, dated August 9, 1870.

*To all whom it may concern:*

Be it known that I, SAMUEL L. ALLEN, of Cinnaminson, Burlington county, New Jersey, have invented an Improved Planting and Fertilizing Machine, of which the following is a specification.

My invention consists of an improved planting and fertilizing machine, the peculiar features and construction of which are too fully set forth hereinafter to need preliminary explanation, the object of my invention being the uniform discharge from a revolving reservoir, of grain, seeds, or fertilizers, and the uniform distribution of the same over the ground.

Figure 1:
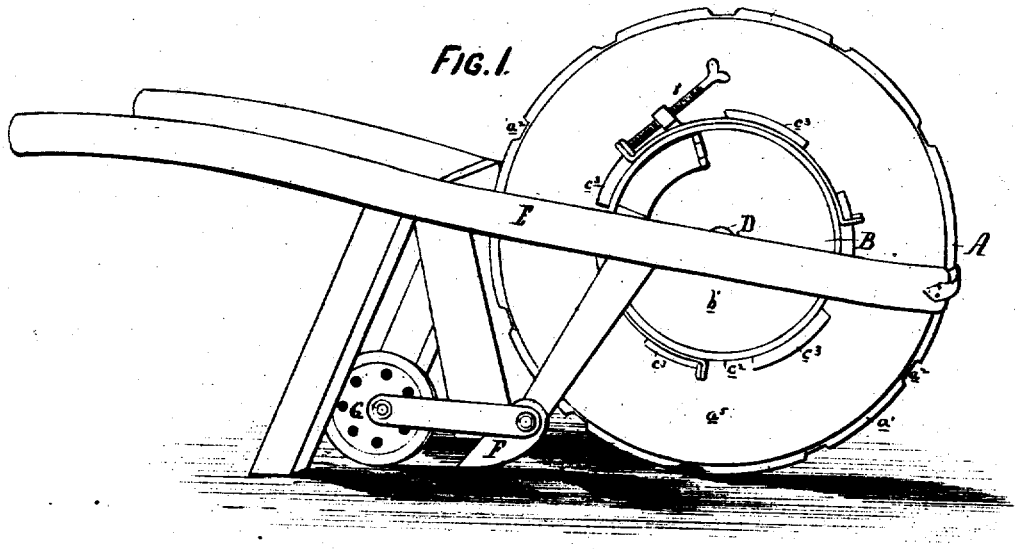
Figure 2:
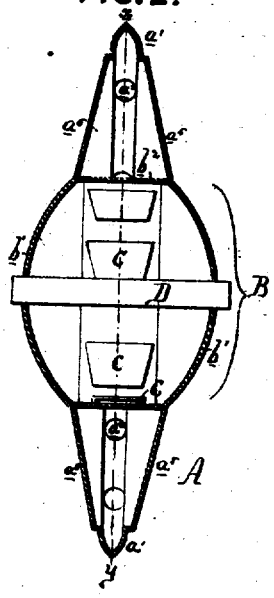
Figure 3:
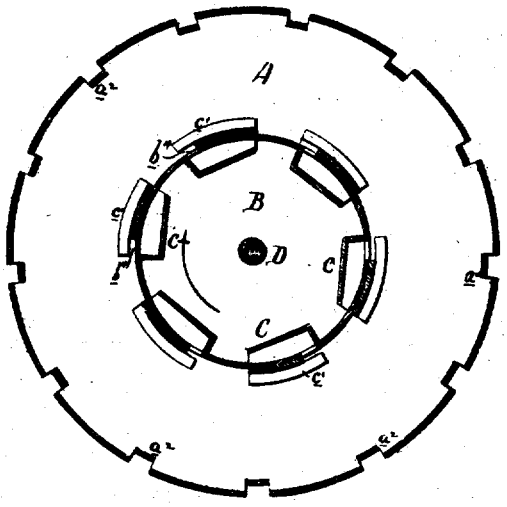
Figure 4:
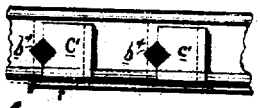

In the accompanying drawings, Figure 1 is a side view of my improved planting and fertilizing machine; Fig. 2, a transverse vertical section of the reservoir and wheel; Fig. 3, a vertical section on the line *x y*, Fig. 2; and Fig. 4, a sectional plan of the adjustable slide and ring for regulating the area of the discharge-openings.

B is a reservoir, which is in the present instance attached to and arranged concentrically with a carrying-wheel, A, the whole being arranged to rotate on or with the axle D of the frame E when the latter is pushed or drawn over the ground. The reservoir B consists in the present instance of two concavo-convex disks, $b'$ $b'$, united at their edges to a short hollow cylinder, $b^2$, which forms the circumference of the reservoir B, the cylinder having a number of holes, $b^4$, (six in the present instance,) arranged at equal distances apart. Around the outer surface of the cylinder $b^2$ is arranged a series of sliding plates, $c'$—one for each of the said holes—the plates being attached to an external adjusting-ring, $c^2$, by which they can be readily adjusted, so as to increase or diminish the area of the holes $b^4$, or entirely close the same, the movement of the slides being controlled by a set-screw, 8, Figs. 1 and 4. Around the inside of the cylinder $b^2$ of the reservoir are arranged as many buckets C as there are holes $b^4$, the buckets being open at the ends pointing toward the direction in which the reservoir has to revolve, (shown by the arrow,) and closed at the opposite ends, one of the holes $b^4$ being situated at or near the closed end of each bucket, and forming the outlet for the same. In the present instance the rim $a'$ of the vessel A is connected to the reservoir B by two annular plates, $a^5$ $a^5$, and this rim may consist of two curved plates, united as shown, so that on rolling the wheel over the ground an indented furrow will be formed for receiving the droppings of the machine. Slots $c^3$ are made in one of the plates $a^5$, near the circumference of the reservoir, so as to permit the connection of the slides $c'$ to the adjusting-ring $c^2$. Holes $a^2$ are arranged at equal distances apart in the rim of the wheel, for permitting the grain or fertilizer discharged from the hopper to drop into the trail or furrow formed by the said rim.

The covering-plates F and roller G, being hinged to the frame E, rest on the ground, but, swinging freely in the rear of the wheel A, may be turned up clear of the ground.

The reservoir having been partially filled with grain through any suitable opening, and the slides $c'$ having been properly adjusted, the machine is ready for being pushed over the ground. As the reservoir revolves in the direction of the arrow, the buckets will pass with their open mouths through the grain, with which they will be filled or partially filled. No discharge of grain, however, will take place from any bucket until it is directly below the axle D, or rather a little beyond that point, when the grain will begin to pass from that bucket through its hole $b^4$, and the bucket will continue to discharge its grain until it arrives at or a little beyond a vertical position. In other words, each bucket will continue to discharge its contents during about one-third of its entire revolution. As each bucket passes downward through the grain and until it arrives at a position directly below the axle, it acts as a shield to prevent the escape of grain through its opening, and after passing from below the axle upward through the grain to a given point, each bucket discharges regularly more or less of the grain it has taken up, but will not permit an indiscriminate discharge from the reservoir. Whether the quantity of grain or fertilizer in the reservoir be great or small, the buckets so perform their duties that the amount discharged from the reservoir will be the same.

It will be seen without further description that the result of rolling the wheel A over the ground must be a uniform and continuous discharge of the contents of the reservoir.

I claim—

1. In a planting or fertilizing machine, a revolving reservoir carried above and free from contact with the ground, having discharge-openings and internal buckets, arranged and operating substantially as described.

2. In combination with the said reservoir, its buckets, and discharge openings, the adjustable slides for increasing and diminishing the size of the said openings.

In testimony whereof I have signed my name to this specification in the presence of two subscribing witnesses.

SAMUEL LEEDS ALLEN.

Witnesses:

J. M. COLGAN,

WM. A. STEEL.